May 13, 1941. O. N. SELLERS 2,241,484
METER CONNECTION
Filed May 31, 1939 2 Sheets-Sheet 1
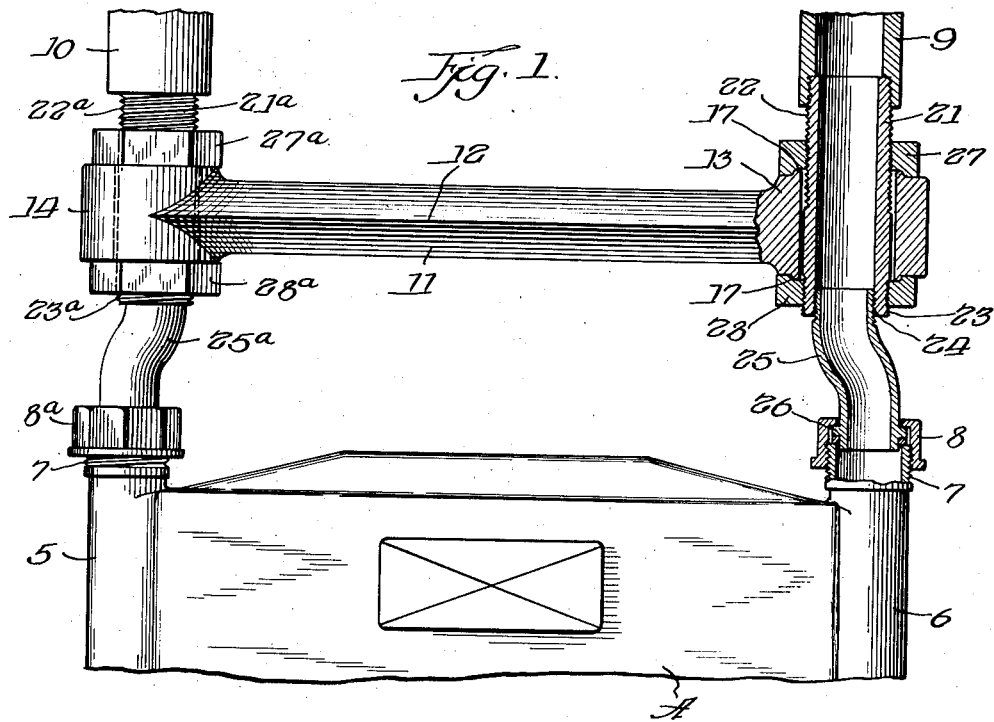
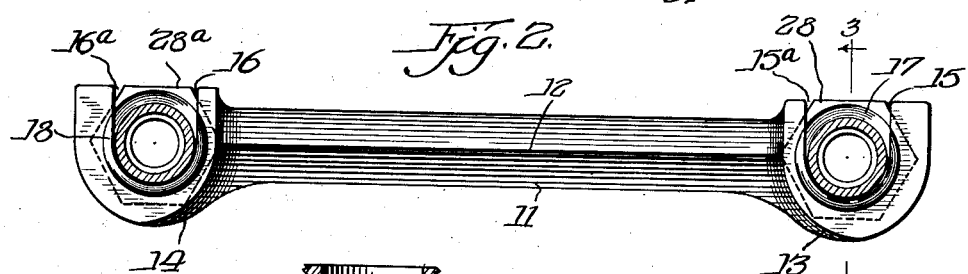
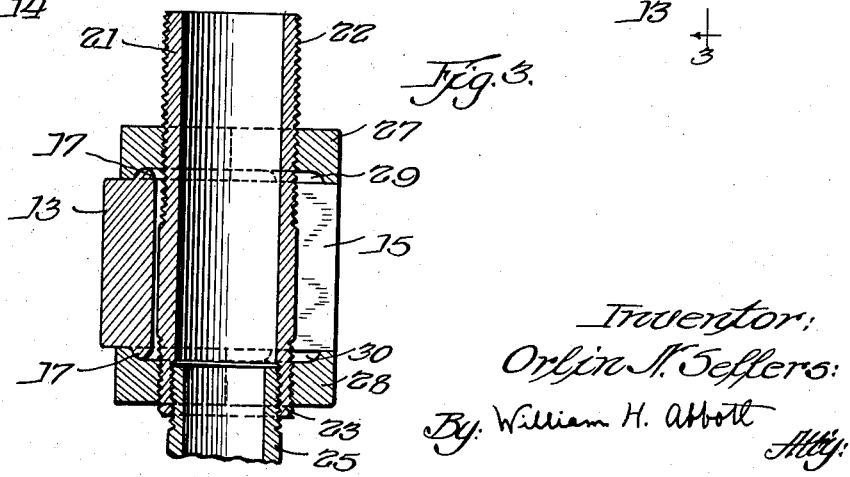

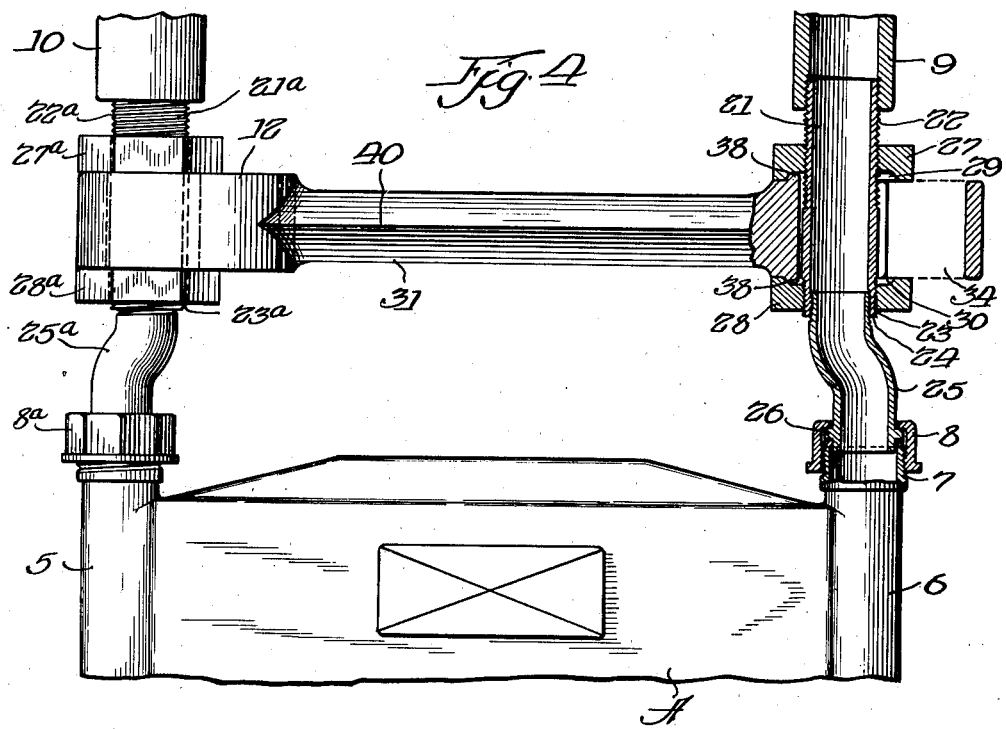
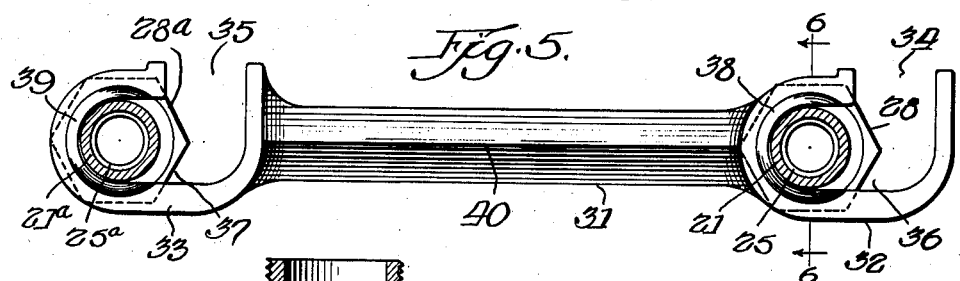
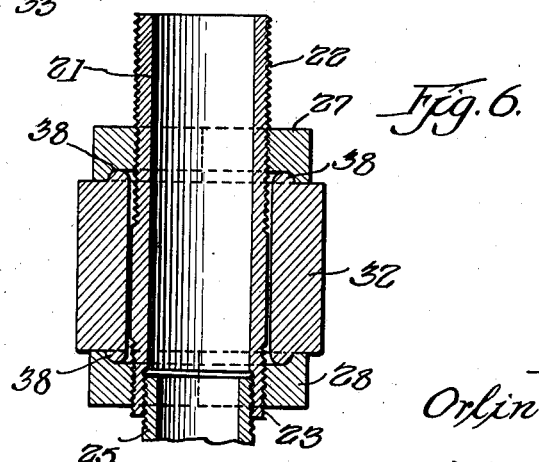

Patented May 13, 1941

2,241,484

UNITED STATES PATENT OFFICE 2,241,484

METER CONNECTION

Orlin N. Sellers, Wilmette, Ill.

Application May 31, 1939, Serial No. 276,496

3 Claims. (Cl. 285—3)

This invention relates to devices for connecting meters to gas supply and outlet pipes and more particularly to devices in which a rigid crossbar is joined to the gas pipes leading to and away from the gas meter. It has long been recognized that a supporting device of this nature is necessary in order to brace the gas outlet pipe which frequently leads upwardly through several stories of a building, and in case of a blow against the supply pipe, there is serious possibility of a leak occurring in or near the meter, in view of the strain on the pipe adjacent thereto. By the use of a bar connecting and supporting the gas supply and outlet pipes, the possibility of a leak occurring adjacent the meter is substantially lessened.

Devices employing a rigid and non-adjustable crossbar of the type described are known to the art. In one form of such device a union outlet is employed. However, it has been found in practice that leaks are apt to occur in this form of device, and the employment of union outlets has been generally condemned by the gas industry. An object of the present invention, therefore, is the provision of a gas meter connection in which the use of a union outlet is eliminated.

In other devices of this type known to the art, a sleeve housing a rotatable barrel is employed to effect the connection between the rigid bar and the gas pipes. In such a device it is obvious that the surfaces of the sleeve and the revolving barrel must be machined to a high degree of accuracy. An object of the present invention is to provide a device of the type described, the parts of which require very little machining, and, consequently, the cost of production is considerably reduced. In my improved device the only surfaces which are machined are the outer annular flanges and corresponding recess portions. From the drawings and the accompanying description it will be readily seen that the device may be economically and readily manufactured.

A further object of the invention is the provision of a meter connecting device which is easy and economical to manufacture and may be readily installed without the employment of highly skilled workmen.

Two embodiments of the invention are shown and they will be readily understood from the following description and the accompanying drawings, in which:

Fig. 1 is a broken vertical view of the invention, partly in section and partly in elevation;

Fig. 2, an intermediate plan view of the invention;

Fig. 3, an enlarged vertical sectional view taken along lines 3—3 of Fig. 2;

Fig. 4, a broken vertical view of a form of the modification of the invention, partly in section and partly in elevation;

Fig. 5, an intermediate plan view of the modification of Fig. 4; and

Fig. 6, an enlarged vertical sectional view taken along lines 6—6 of Fig. 5.

Referring to the drawings, the reference character A indicates a gas meter of conventional construction. The meter is supplied with a gas inlet pipe 5 and a gas outlet pipe 6. The pipes 5 and 6 are usually formed integrally with the casing of the meter and are provided at their upper ends with external screw threads 7 adapted to be engaged by the meter caps 8, 8a.

Referring to Figs. 1 and 4 wherein fragments of the gas inlet pipe 10 and the gas outlet line 9 are shown, it will be seen that the coupling upon the outlet line is shown in section, and since the coupling on the inlet side is substantially the same in construction, it is shown in elevation and the like parts shown of the inlet coupling are designated by the same reference characters as the parts of the other coupling and are distinguished by the addition of the suffix "a."

Referring to the embodiment of the invention shown in Figs. 1 to 3, the connecting member 11 comprises a rigid crossbar preferably formed of cast iron and provided with longitudinal ribs 12. The cylindrical ends 13 and 14 of the crossbar 11 are of increased cross section and, as shown in Fig. 2, are provided with vertical bores 15, 16, forming sockets adapted to receive and house pipe portions of the couplings as hereinafter described. It will be seen that the sockets 15, 16 are rounded and are of sufficient size and open along one side thereof as indicated at 15a, 16a to provide generally vertical U-shaped sockets, as shown in Fig. 2, to permit the facile entrance of pipe sections. The edges of the upper and lower surfaces of the end portions 13, 14, forming the sockets 15, 16, are provided with annular ridges 17, 18, respectively.

Adapted to be retained in the sockets 15, 16 of the crossbar 11 are pipe sections 21, 21a provided with external screw threads 22, 22a and 23, 23a along the upper and lower portions thereof, respectively; the lower portions of the pipe sections are equipped with internal screw threads 24, 24a. As shown in Fig. 1, the upper portions of the pipe sections 21, 21a are screwed into the gas outlet 9 and inlet 10, respectively, to form a gas-tight connection.

The pipe sections 25, 25a are connected to the lower portion of the pipe sections 21, 21a by a screw thread connection with the internal threads 24, 24a of the latter members. The lower ends of the pipe sections 25, 25a are provided with annular retaining flanges 26 forming a seat for the meter caps 8, 8a and a tight connection with meter pipes 5 and 6. Thus it will be apparent that the sections 25, 25a serve as coupling nipples to connect the inlet and outlet lines 5, 6 of the meter to pipe sections 21a, 21. Since the spacing between the meter pipes 5 and 6 varies in different installations and it is necessary that the coupling members be made to register with the meter pipes, the connecting members 25, 25a are of the offset or swivel type and may be adjusted horizontally to register with the inlet and outlet pipes of the meter.

Lock nuts 27, 27a and 28, 28a are carried on the upper and lower portions of pipe sections 21, 21a, respectively, and form a screw thread connection with the external threads 22, 22a and 23, 23a, respectively. The nuts are adapted to maintain securely the crossbar 9 and pipe sections 21, 21a in fixed position and, accordingly, are provided with inner annular recesses 29, 30 adapted to form a retaining seat for the ridge portions 17 carried on both ends 13, 14 of crossbar 11 and firmly lock the nuts against rotation and consequent loosening.

The pipe sections 21, 21a may be of ¾" pipe and the thread of the swivel sections 25, 25a of ½" pipe. It will thus be seen that the only parts of my improved meter connecting device that require machining are the annular ridges 17 and the grooves 30.

My improved meter connecting device may be readily assembled. Several of the parts may be assembled prior to shipment, for example, the lock nuts 27, 27a, 28, 28a may be threaded onto pipe sections 21, 21a and the offset coupling members 25, 25a threaded into the lower internal threads of the pipe sections. To install the device, the upper threaded portions 22, 22a of pipe sections 21, 21a are screwed into the gas service inlet and outlet pipes 9 and 10. The crossbar 11 is then brought into position by horizontal movement in such manner that the vertical sockets 15 and 16 at the ends 13, 14 of the bar 11 receive the pipe sections 21, 21a between the spaced lock nuts. The lock nuts 27, 28, 27a, 28a are then rotated upon the threaded exterior of their respective pipe sections until the annular recesses 29, 30 of the nuts are securely engaged in the annular ridges 17, 18, disposed around the edges of the pipe sockets, thereby locking the nuts upon the crossbar and maintaining the pipe sections 21, 21a against axial movement. The meter A may then be elevated into position and the meter caps 8, 8a rotated to effect a gas-tight connection, after the swivel members 25, 25a have been horizontally adjusted to conform accurately with the spread of the meter pipes 5, 6.

Referring to the modification shown in Figs. 4, 5, and 6, the coupling members comprising the pipe sections and the locking nuts may be of the same construction as shown in Figs. 1, 2 and 3 and, accordingly, will be given the same reference characters. In this modification, as shown in Fig. 5, the rigid crossbar is of a different construction than the crossbar 11 previously described. The crossbar 31 is preferably formed of iron and cast in one piece and is provided with a longitudinal rib 40. The ends 32 and 33 of the crossbar are of greater cross section than its intermediate portion and, as shown in Fig. 5, are provided with vertical L-shaped passages forming openings 34 and 35 and offset sockets 36 and 37 to receive and house pipe portions of the couplings previously described. It will be seen that the sockets 36 and 37 are rounded and that the sockets and passages are of sufficient size to permit the facile entrance of the pipe sections 21 and 21a. The L-shaped passages in the end portions 32 and 33 are complementary to each other in that the openings 34 and 35 are on the right-hand sides of the end portions 32 and 33 (Fig. 5), and the socket portions 36 and 37 are to the left thereof. The edges of the upper and lower surfaces of the end portions 32 and 33, forming the sockets 36 and 37, are provided with annular ridges 38 and 39.

As previously mentioned, the sockets 36 and 37 are adapted to engage pipe sections 21 and 21a adapted to be threaded into gas inlet and outlet pipes 9 and 10 and connected to the meter pipes 5 and 6 by swivel connecting members 25 and 25a. The crossbar 31 and the coupling members are held in fixed engagement by locking nuts 27 and 27a, 28 and 28a, provided with annular recesses 29 and 30 on their inner surfaces, respectively, adapted to engage the complementary annular ridges 38 and 39 enclosing the sockets 36 and 37.

To install the device, the pipe sections 21 and 21a are screwed into the gas inlet and outlet pipes 9 and 10. The crossbar 31 is then brought into engagement by moving it horizontally toward the pipe sections 21 and 21a until the sections between the spaced L-shaped nuts are within the L-shaped openings 34 and 35. The bar 31 is then moved horizontally toward the right, until the pipe sections are in sockets 36 and 37 of the crossbar, as shown in Fig. 5. The locking nuts 27, 27a, 28 and 28a are then rotated upon the threaded exterior of the pipe sections until the annular recesses 29 and 30 of the nuts are securely engaged in the annular ridges 38 and 39, disposed around the edges of the sockets 36 and 37, thereby locking the nuts upon the cross bar and maintaining the pipe sections 21, 21a against axial movement. The meter may then be elevated into position and the meter caps 8, 8a rotated to effect a gas-tight connection, after the swivel members 25 and 25a have been horizontally adjusted to conform accurately with the spread of the meter pipes 5 and 6.

The foregoing detailed description has been given for clearness of understanding only, and no unnecessary limitations should be understood therefrom.

Having thus described my invention and illustrated its use, what I claim as new and desire to secure by Letters Patent is:

1. In a gas meter connection, the combination with a meter and service pipes leading to and away from said meter, of a pair of threaded pipe sections connected to said service pipes, a rigid horizontally disposed crossbar having complementary pipe receiving sockets extending vertically through each end of said crossbar, said sockets being provided with an opening along a wall thereof adapted to receive the said pipe sections by horizontal movement of said crossbar, and nuts carried on said pipe sections above and below said crossbar provided with annular members adapted to interlock with corresponding annular members on the ends of said crossbar to retain said crossbar in fixed position.

2. In a meter connecting device, the combination of gas inlet and outlet service pipes, a pair of threaded pipe sections connected to said service pipes, a meter having inlet and outlet lines integral therewith, offset coupling members connecting said pipe sections and said meter lines, a rigid bar extending horizontally between said pipe sections having enlarged end portions provided at the ends thereof with U-shaped sockets extending vertically therethrough, said sockets being adapted to engage said pipe sections by horizontal movement of said bar while said pipe sections are in connected relation with said service pipes and coupling members, annular retaining members on the upper and lower edges of said end sections of said rigid bar, nuts carried on said pipe sections above and below said crossbar, and retaining members carried on said nuts complementary to said first mentioned retaining members and adapted to interlock to retain said rigid bar in fixed position and said pipe sections against axial movement.

3. In a meter connecting device, the combination of gas inlet and outlet service pipes, a pair of threaded pipes sections connected to said service pipes, a meter having inlet and outlet lines, swivel members connecting said pipe sections and said meter lines, a rigid bar extending horizontally between said pipe sections provided with L-shaped passages extending vertically through the ends of said bar and complementary to each other, said passages being shaped to receive said pipe sections by two horizontal movements of said bar and being provided with offset sockets loosely engaging said pipe sections, nuts carried on said threaded pipe sections above and below said crossbar and provided with annular members adapted to interlock with corresponding annular members on the ends of said crossbar to retain said pipe sections and service pipes against axial displacement.

ORLIN N. SELLERS.